(12) United States Patent
Meloche (10) Patent No.: US 8,238,254 B2
(45) Date of Patent: Aug. 7, 2012

(54) DETECTION AND DISPLAY OF PACKET CHANGES IN A NETWORK

(75) Inventor: Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 177 days.

(21) Appl. No.: 12/622,840

(22) Filed: Nov. 20, 2009

(65) Prior Publication Data
US 2010/0290344 A1 Nov. 18, 2010

Related U.S. Application Data

(60) Provisional application No. 61/178,121, filed on May 14, 2009.

(51) Int. Cl.
*G01R 31/08* (2006.01)
*H04L 12/28* (2006.01)
(52) U.S. Cl. ........................ 370/241; 370/254
(58) Field of Classification Search .................. 370/241, 370/242, 245, 251, 395.21, 395.1, 395.31, 370/395.42, 400, 238, 350, 351; 709/226, 709/240, 224, 225, 228, 229
See application file for complete search history.

(56) References Cited

U.S. PATENT DOCUMENTS

| | | | |
|---|---|---|---|
| 6,243,454 B1 | 6/2001 | Eslambolchi | |
| 6,363,053 B1 * | 3/2002 | Schuster et al. | 370/230 |
| 6,411,923 B1 | 6/2002 | Stewart et al. | |
| 6,542,504 B1 | 4/2003 | Mahler et al. | |
| 6,760,345 B1 | 7/2004 | Rosengard | |
| 6,775,240 B1 | 8/2004 | Zhang et al. | |
| 7,136,359 B1 | 11/2006 | Coile et al. | |
| 7,173,910 B2 | 2/2007 | Goodman | |
| 7,203,173 B2 | 4/2007 | Bonney et al. | |
| 7,340,529 B1 | 3/2008 | Yazaki et al. | |
| 7,355,981 B2 | 4/2008 | Jorgenson | |

(Continued)

FOREIGN PATENT DOCUMENTS

EP 1763193 A1 3/2007

(Continued)

OTHER PUBLICATIONS

Fluke Networks, Webpage, "Visual Performance Manager for Application Performance Management—Fluke Networks," website: http://www.flukenetworks.com/fnet/en-us/products/Visual+Performance+Manager/Overview..., Mar. 13, 2009, pp. 1-2.

(Continued)

*Primary Examiner* — Hanh Nguyen
(74) *Attorney, Agent, or Firm* — Sheridan Ross P.C.

(57) ABSTRACT

The system and method send test packets into a network between a plurality of source and destination nodes. Each source node is also a destination node. The test packet contains an additional field (e.g., a field of particular interest to an application or user) that is subject to being modified as the test packet traverses the network (e.g., a DSCP marking). A determination is made if the additional field has changed; if so, the network node that changed the additional field is identified and displayed to a user in a matrix display of the source nodes and destination nodes. This allows a user to identify situations where changes in the additional field may indicate that the test packet is being routed in the network at a priority that is outside of a Service Level Agreement.

16 Claims, 4 Drawing Sheets

U.S. PATENT DOCUMENTS

| | | | |
|---|---|---|---|
| 7,583,613 B2 * | 9/2009 | Klotz et al. | 370/252 |
| 7,899,048 B1 | 3/2011 | Walker et al. | |
| 7,984,147 B2 * | 7/2011 | Daoud et al. | 709/226 |
| 8,014,399 B2 * | 9/2011 | He | 370/392 |
| 2001/0050903 A1 | 12/2001 | Vanlint | |
| 2002/0012388 A1 | 1/2002 | Eldumiati et al. | |
| 2002/0021680 A1 | 2/2002 | Chen | |
| 2002/0057690 A1 | 5/2002 | Kingsley | |
| 2002/0191614 A1 | 12/2002 | Ido et al. | |
| 2002/0193999 A1 | 12/2002 | Keane et al. | |
| 2003/0028634 A1 | 2/2003 | Oshizawa | |
| 2003/0086425 A1 | 5/2003 | Bearden et al. | |
| 2003/0165162 A1 | 9/2003 | Westphal | |
| 2004/0052216 A1 | 3/2004 | Roh | |
| 2004/0172464 A1 | 9/2004 | Nag | |
| 2005/0041660 A1 | 2/2005 | Pennec et al. | |
| 2005/0234729 A1 | 10/2005 | Scholl | |
| 2006/0190594 A1 | 8/2006 | Jorgenson et al. | |
| 2006/0215596 A1 | 9/2006 | Krishnaswamy et al. | |
| 2006/0218447 A1 | 9/2006 | Garcia et al. | |
| 2006/0227714 A1 | 10/2006 | Griffin et al. | |
| 2007/0081471 A1 | 4/2007 | Talley, Jr. et al. | |
| 2007/0086336 A1 | 4/2007 | Richards et al. | |
| 2007/0252695 A1 | 11/2007 | Bhavani | |
| 2007/0286351 A1 | 12/2007 | Ethier et al. | |
| 2008/0259806 A1 | 10/2008 | Jorgenson | |
| 2008/0313312 A1 | 12/2008 | Flynn et al. | |
| 2009/0003225 A1 | 1/2009 | Klassen et al. | |
| 2009/0073906 A1 | 3/2009 | Yi et al. | |
| 2009/0219825 A1 | 9/2009 | Denby | |
| 2009/0268622 A1 | 10/2009 | Blum et al. | |
| 2010/0027429 A1 | 2/2010 | Jorgens et al. | |
| 2010/0080150 A1 | 4/2010 | Steiner | |

FOREIGN PATENT DOCUMENTS

| | | |
|---|---|---|
| EP | 1228619 B1 | 2/2008 |
| WO | WO 2006/065863 A2 | 6/2006 |
| WO | WO 2007/036786 A2 | 4/2007 |

OTHER PUBLICATIONS

Network Instruments, "VoIP Analysis, Manager, Monitor, and Maintain VoIP Communications Across Enterprise Networks with Observer," 2006, Product Brochure, US, 4 pages.

Meloche, U.S. Appl. No. 12/433,630, filed Apr. 30, 2009, entitled "System and Method for Monitoring a Network Communication at Multiple Network Layers," 33 pages.

Meloche, U.S. Appl. No. 12/410,980, filed Mar. 25, 2009, entitled "System and Method for Sending Packets Using Another Device's Network Address," 19 pages.

Meloche, U.S. Appl. No. 12/434,265, filed May 1, 2009, entitled "System and Method for Testing a Dynamic Communication Across a Network," 31 pages.

Meloche, U.S. Appl. No. 12/436,651, filed May 6, 2009, entitled "Intelligent Multi-Packet Header Compression," 26 pages.

Meloche, U.S. Appl. No. 12/533,483, filed Jul. 31, 2009, entitled "System and method for Comparing Packet Traces for Failed and Successful Communications," 30 pages.

\* cited by examiner

DETECTION AND DISPLAY OF PACKET CHANGES IN A NETWORK

CROSS-REFERENCE TO RELATED APPLICATIONS

This application claims the benefit under 35 U.S.C. §119 (e) of U.S. Provisional Application No. 61/178,121, filed May 14, 2009, entitled "System and Method for VoIP Service Level Agreement Monitoring in Wide Area Networks via DSCP Mark Tracking."

TECHNICAL FIELD

The system and method relate to network monitoring systems, and in particular to network monitoring systems that monitor and display changes in the end-to-end performance of their transmission and relationships between different types of packets.

BACKGROUND

Currently, there are various systems that monitor packets that are sent into and received from a network. These systems can identify characteristics of a packet sent into the network and then can identify any changes to the packet once it leaves the network. However, these systems break down in providing user friendly analysis to identify where changes occur within the network, especially when the network in controlled by another entity such as one or more service providers. This is because each service provider may route packets using different processes and may not provide the user with access to data within the service provider's network.

For example, many service provider networks will change the Differentiated Service Code Point (DSCP) markings (the Type of Service field in the Internet Protocol Packet Header) of packets entering the network to DSCP marking specific to the service provider (e.g., specific to a particular Quality of Service (QoS) for a packet type). Upon exiting the network, the service provider will set the DSCP markings back to the same value as when the packet entered the network. If the DSCP markings that the service provider are using in the network are for a lower Quality of Service than the Quality of Service required under a Service Level Agreement, current systems cannot detect this easily. If the DSCP markings for packets entering the network are different than the DSCP markings for the same packet leaving the network, existing systems may be able to identify that there is a problem; however they are unable to identify a specific node within the network that is causing the problem. This problem becomes worse when different markings are used for different packet types. Current systems may be unable to identify problems for different markings (e.g., markings for voice packets, data packets, audio packets, and the like).

Other systems, such as the system disclosed in U.S. Publication No. 2007/0086336, disclose a system that monitors packets sent into and returned from a service provider network using edge routers. The edge routers identify an application layer policy that is applied to the packets sent into and returned from the network. Metrics of the packets are generated and specific actions can be taken when specific metrics are detected. However, this system cannot detect specific nodes within the service provider network that may be the cause of routing packets at a Quality of Service that is less than provided in a Service Level Agreement. Moreover, this system cannot detect specific nodes within the service provider network that are changing fields in packets that may indicate a specific Quality of Service problem.

SUMMARY

The system and method are directed to solving these and other problems and disadvantages of the prior art. The system and method send test packets into a network between a plurality of source and destination nodes. Each source node is also a destination node. The test packet contains an additional field (e.g., a field of particular interest to an application or user) that is subject to being modified as the test packet traverses the network (e.g., a DSCP marking) A determination is made if the additional field has changed, and if so, the network node that changed the additional field is identified and displayed to a user in a matrix display of the source nodes and destination nodes. This allows a user to identify situations where changes in the additional field may indicate that the test packet is being routed in the network at a priority which is outside of a Service Level Agreement.

BRIEF DESCRIPTION OF THE DRAWINGS

These and other features and advantages of the system and method will become more apparent from considering the following description of an illustrative embodiment of the system and method together with the drawing, in which.

DETAILED DESCRIPTION

Figure 1:
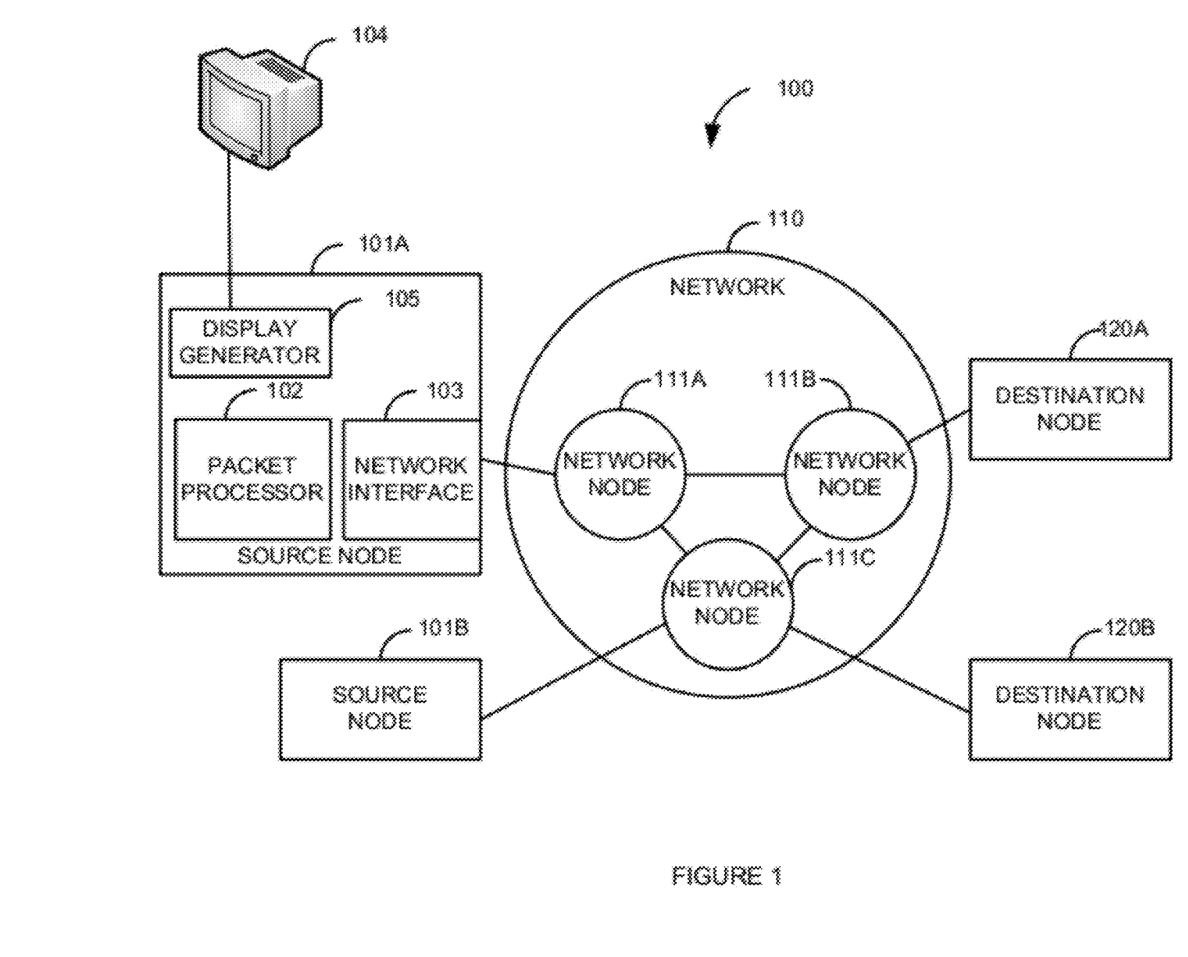
FIG. 1 is a block diagram of a first illustrative system for detecting packet changes in a network.

FIG. 1 is a block diagram of a first illustrative system 100 for detecting packet changes in a network 110. The first illustrative system 100 comprises one or more source nodes 101, a display 104, a network 110, and one or more destination nodes 120.

The source node 101 comprises a packet processor 102, a network interface 103, and a display generator 105. The source node 101 is shown as comprising the packet processor 102, the network interface 103, and the display generator 105; however, the packet processor 102, the network interface 103, and the display generator 105 can be distributed. The source node 101 can be any device capable of sending and receiving packets, such as a telephone, a Personal Computer (PC), a Personal Digital Assistant (PDA), a video camera, a server, a router, and the like. The network interface 103 can be any device capable of sending and receiving packets on a network 110 such as a network card, a wireless network card, and the like. The packet processor 102 can be any device capable of processing packets such as a microprocessor, a microcontroller, a personal computer, a network analyzer, and the like. The display generator 105 can be any device capable of generating a video display such as a video card and the like.

The network 110 as shown comprises three network nodes 111A-111C. However, the network 110 can comprise one or more network nodes 111. The network 110 can comprise multiple networks 110. The network 110 can be any type of network 110 such as the Internet, a Local Area Network (LAN), a Wide Area Network (WAN), a service provider network, a cellular network, a wireless network, a wired network, and/or any combination of these, and the like. The network node 111 can be any device capable of receiving and sending packets such as a router, a server, a hub, a switch, a Network Address Translator (NAT), a firewall, a gateway, and the like. The display 104 can be any device capable of displaying information such as a monitor, a television, a PC, and the like. The destination node 120 can be any device capable of receiving packets such as a telephone, a PC, a PDA, a video camera, a server, a router, a gateway, and the like. The destination node 120 typically also comprises a source node 101 and the source node 101 typically comprises a destination node 120.

Packet processor 102 in source node 101A creates or gets a test packet. An illustrative test packet comprises a hop count field, a destination node address field, and an additional field. The hop count field can be any field used to count hops (i.e., the number of network nodes 111 that have seen or routed the test packet). For example, a hop count field can be an Internet Protocol Time to Live field, an Internet Packet EXchange (IPX) transport control field, a Routing Information Protocol (RIP) hop-count field, and the like. The hop count field is typically incremented or decremented by a value when a network node 111 routes the test packet across the network 110. The additional field can be any field that may be changed by network nodes 111 as the test packet traverses network nodes 111 in the network 110, such as an Internet Protocol Type of Service Field, a Differentiated Service Code Point (DSCP) marking, a Transmission Communication Protocol (TCP) port, a User Datagram Protocol (UDP) port, and the like. The additional field can be a defined field in a packet header or a field in the payload of the test packet. The destination node address field contains the network address of the destination node 120 of the test packet.

The network interface 103 sends the test packet into the network 110. The first time a test packet is sent, the hop count field will be typically set to one. The hop count field is then decremented (typically by one) by each network node 111 that receives the test packet. When network node 111A receives the test packet with a hop count field with a value of one, the hop count field in the test packet is decremented by one to zero. When the hop count field reaches zero (expiration of the hop count) in a network node 111A (e.g., a router), the test packet is typically discarded and a response packet (e.g., an error message) is sent back to the source node 101A (via network interface 103) that sent the test packet. The response packet contains a field having a value of the additional field that was derived from the test packet. The network interface 103 receives the response packet from the network node 111A.

The packet processor 102 determines if the value of the additional field has been changed at one of the network nodes 111 in the network 110. If the additional field has been changed by one of the network nodes 111, the packet processor 102 identifies which network node 111 changed the additional field. The display generator 104 can then generate a display which indicates which node changed the value of the additional field. This is then displayed in the display 104.

The packet processor 102 determines if the test packet has reached the destination node 120A. This can be accomplished by waiting for the response packet to arrive within a predetermined time period. If the response packet has been received within the time period, the packet processor 102 can determine that the test packet has not reached the destination node 120A because the response packet was sent from network node 111A and the test packet was dropped by network node 111A. After receiving the response packet, the above process is then repeated by sending a new test packet with the incremented hop count field.

For example, the sent test packet is an Internet Protocol (IP) packet, the destination node address field is set to the address of destination node 120A, the hop count field is the IP Time to Live (TTL) field with a value of 1, and the additional field is the Type of Service field used for DSCP marking of packets with a value of 26; when the test packet is received by network node 111A, network node 111A changes the DSCP marking in the Type of Service field (additional field) to 0. Network node 111A then decrements the TTL field (hop count field) to 0. Network node 111A then determines that the TTL field is zero and the test packet should not be routed across the network 110 because the TTL field has expired. Network node 111A responds by sending an Internet Control Message Protocol (ICMP) TTL exceed packet; the response ICMP TTL exceeded packet that contains the header of the test packet (with the changed DSCP marking of 0 and TTL field of 0) as part of the payload of the ICMP packet along with the source address of network node 111A in the IP header of the ICMP packet. After the response ICMP packet is received by the network interface 103, the packet processor 102 can then determine that network node 111A changed the DSCP marking (because network node 111A's address is in the response ICMP packet) in the test packet from 26 to 0.

Since packet processor 102 received the response ICMP packet from network node 111A, the packet processor 102 determines that the packet did not reach destination node 120A. The packet processor 102 increments the TTL field to 2 in the test packet. The network interface 103 sends the test packet to network node 111A. Network node 111A changes the DSCP marking to 0 and decrements the TTL field from 2 to 1 in the test packet. Network node 111A then routes the test packet to network node 111B. Network node 111B changes the DSCP marking from 0 to 26 and decrements the TTL field from 1 to 0 in the test packet. Network node 111B determines that the TTL field is 0 and has expired. Network node 111B sends a response ICMP packet with the changed DSCP marking of 26 and the TTL field of 0 as part of the payload of the ICMP packet along with network node 111B's source address in the response ICMP packet's IP header. After the network interface 103 has received the response ICMP packet, the packet processor 102 can determine that network node 111B changed the DSCP marking for the test packet from 0 to 26.

Since the packet processor 102 received the response ICMP packet from network node 111B, the packet processor 102 determines that the test packet did not reach destination node 120A. The packet processor 102 increments the TTL field to 3. The network interface 103 sends the test packet for a third time. The above process is repeated, except because the TTL field is set to 3, the test packet reaches destination node 120A and no ICMP packet is sent because network nodes 111A and 111B did not decrement the TTL field to 0. Because no ICMP packet was received by the network interface 103, the packet processor 102 assumes that the packet was received by destination node 120A. The packet processor 102 can also determine that the test packet was received by the destination node 120A in other ways such as receiving an acknowledgement packet from a higher layer protocol such as Transmission Communication Protocol (TCP).

The above-described processes can also be used to track changes in other packet fields such as User Datagram Protocol (UDP) ports, Transmission Control Protocol (TCP) ports. Sometimes Network Address Translators (NAT) and/or firewalls change the UDP/TCP port numbers or other fields in packets. The above-described processes can be used to track the changes in the TCP/UCP port numbers and other packet fields used by NATs and/or firewalls. Tracking of any changes to UDP/TCP port numbers by NATs/firewalls can be used to detect packet routing problems and improperly configured NATs/firewalls.

The process of sending the test packet can be performed periodically. This way, if a network node 111 is configured differently at a later point in time, the packet processor 102 will detect the new change in the additional field and report the changes to a user via the display 104.

The above-described process can be used to track multiple additional fields at the same time. For example, a user may want to track changes in DSCP markings and changes in UDP port numbers for network nodes 111 in the network 110. Using the above process, the packet processor 102 can detect a change in a DSCP marking and a change in a UDP port using the same test packet and response packet by looking at the two fields in the response packet.

The above-described process can be repeated for destination node 120B and any other destination nodes (not shown). Likewise, source node 101B can use this process by sending packets from its network interface (not shown) to destination node 120A and then 120B. The information on which network node 111 that changed the additional field can then be sent to source node 101A. This way a full determination of how each of the network nodes 111A-111C changes the additional field can be determined; this can then be displayed in the display 104 using a matrix (See FIG. 3) that shows each of the source nodes 101 and each of the destination nodes 120. Each of the destination nodes 120 also has a source node 101 and the source nodes 101 are destination nodes. This way, packets can be sent between all nodes to build a matrix. If a node is both a source node 101 and a destination node 120, the node does not need to send test packets to itself, but can to evaluate its performance.

In addition, the above processes can be repeated using different values for the additional field. For example, a network node 111 can change the additional field (e.g., DSCP markings) differently based on what the value of the additional field is when received at the network node 111. Many service providers define the DSCP markings used in their networks 110 differently than defined by customers or by other service providers. A service provider may change the DSCP markings differently based on the type of data being sent in a packet. For example, a DSCP marking of 10 (voice outside the network) may be changed to a value of 26 (voice inside the network) while the packet is within the network 110; the DSCP marking is then changed back to 10 when the packet is sent out of the network 110. A video packet may be marked differently. For example, a DSCP marking of 12 (video outside the network) may be changed to 28 (video in the network) while the packet is within the network 110 and then changed back to 12 when the packet is sent out of the network 110. These changes in markings may be in accordance with a Service Level Agreement (SLA).

By sending different values in the additional field, the packet processor 102 can determine if the network nodes 111 in the network 110 are properly changing the DSCP markings in accordance with the SLA. For example, if network node 111A changes a voice test packet DSCP marking of 10 (voice outside the network) to 4 (which is data within the network) and then network node 111B sets the DSCP marking from 4 to 10 when the test packet is sent to the destination node 120A, the packet processor 102 can determine that the test packet was not sent in accordance with the SLA because the voice packet was sent at a lower Quality of Service (data) in the network 110. The test packet should have been marked to 26 when the packet was sent in the network 110 in accordance with the SLA.

The method of detecting packet changes can be done in different ways such as having a network analyzer (not shown) in each network node 111 which detects the changes in the test packets. The information can be sent to the packet processor 102 to determine when changes to the additional field are made.

Figure 2:
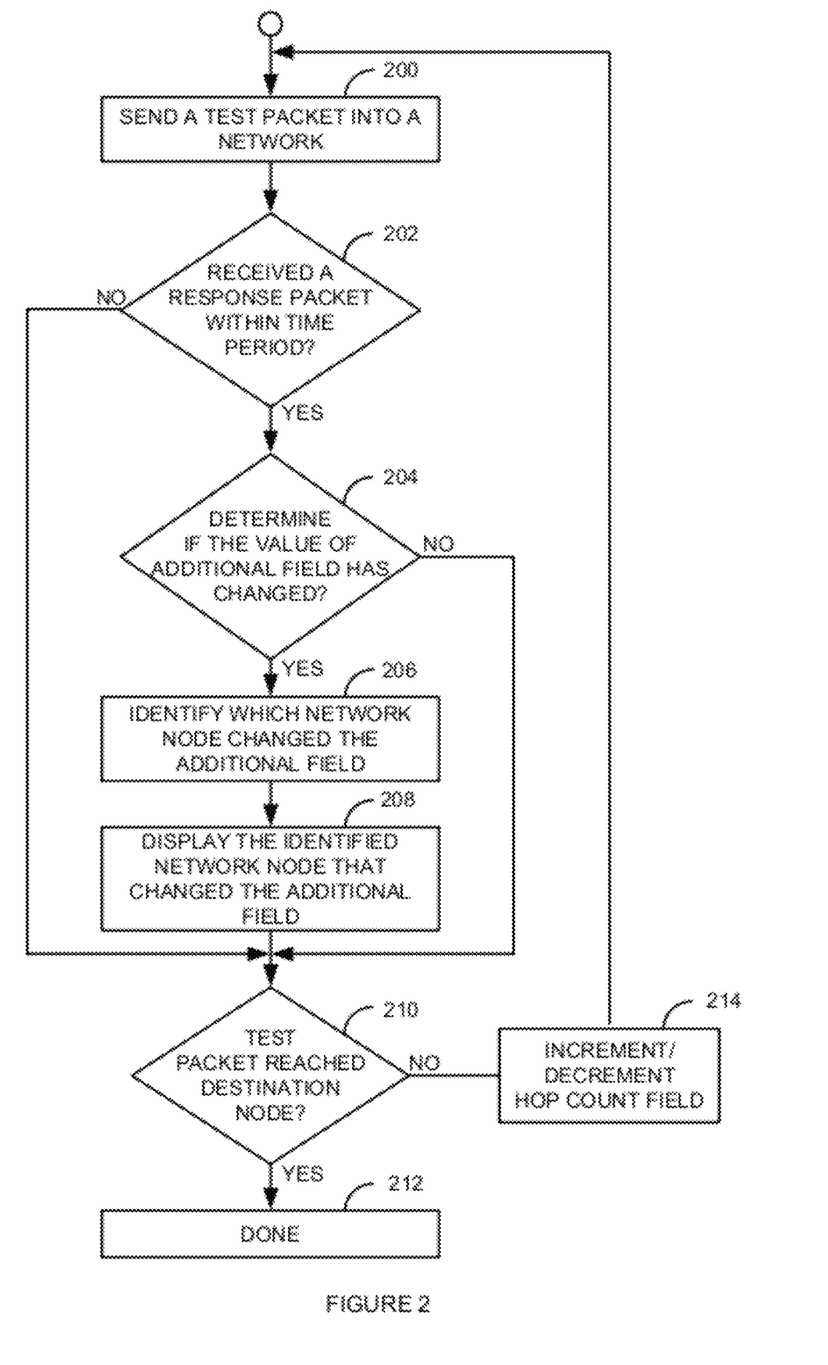
FIG. 2 is a flow diagram of a method for detecting packet changes in a network.

FIG. 2 is a flow diagram of a method for detecting packet changes in a network 110. Illustratively, the packet processor 102, the network interface 103, the network nodes 111, and the destination nodes 120 are stored-program-controlled entities, such as a computer or processor, which performs the method of FIG. 2 by executing a program stored in a storage medium, such as a memory or disk.

The network interface 103 sends 200 a test packet into the network 110. The test packet comprises a hop count field, a destination node address field, and an additional field. The additional field is subject to being modified as the test packet traverses various network nodes 111 within the network 110. The network interface 103 waits to receive in step 202 a response packet from a network node 111. This can be based on receiving the response packet within a period of time or other methods. The response packet contains a field that has a value of the additional field derived from the test packet as the test packet traversed the network node 111 that sent the response packet. If a response packet was not received in step 202, the process goes to step 210.

Otherwise, if a response packet is received by the network interface 103 in step 202, the packet processor 102 determines in step 204 if the value of the additional field has changed. If the value of the additional field has not changed in step 204, the process goes to step 210. Otherwise, if the value of the additional field has changed in step 204, the packet processor 102 identifies 206 which network node 111 changed the additional field.

The packet processor 102 can identify in step 206 which network node 111 changed the additional field in different ways depending upon how the network nodes 111 process the test packet. For example, if the network nodes 111 in the network 110 change the additional field before sending the response packet, the packet processor 102 identifies 206 the network node 111 that sent the response packet as the network node 111 that changed the additional field. This can be done automatically by looking at the network address of the network node 111 that sent the response packet.

If the network nodes 111 in the network 110 do not change the additional field before sending the response packet, then the packet processor 102 will identify 206 the previous network node 111 that routed the test packet as the network node 111 that changed the additional field. This may have to be accomplished by looking at a previous response packet to get a network address of the network node 111 that changed the additional field; in addition, this may be accomplished with the current response packet if the network address of the last network node 111 to send the test packet is in the current response packet.

The display generator 105 can generate a display that indicates that a network node changed the additional field. The display 104 can then optionally display 208 the identified network node 111 that changed the additional field. Instead of displaying the identified network node 111 in step 208, the packet processor 102 can send the identified network node 111 to a different packet processor 102, a network monitor (not shown), and/or any other system that can use the information. The process of displaying which network node(s)

changed the additional field can be done incrementally as shown in FIG. 2, or the data could be stored and periodically displayed all at once.

The process then tests 210 to see if the test packet reached the destination node 120. This is typically when a response packet was not received within the time period (from step 202). If the test packet has reached the destination node 120, the process is done 212. Otherwise, if the test packet has not reached the destination node 120 in step 210, the packet processor 102 increments or decrements 214 (depending on the protocol used in the network nodes 111) the hop count field. The hop count field will typically be decremented (e.g., in Internet Protocol) in step 214. However, other protocols may increment the hop count field in step 214. The process then goes back to step 200 to repeat the process of FIG. 2 using a new test packet with the incremented/decremented hop count field in the test packet.

Figure 3:
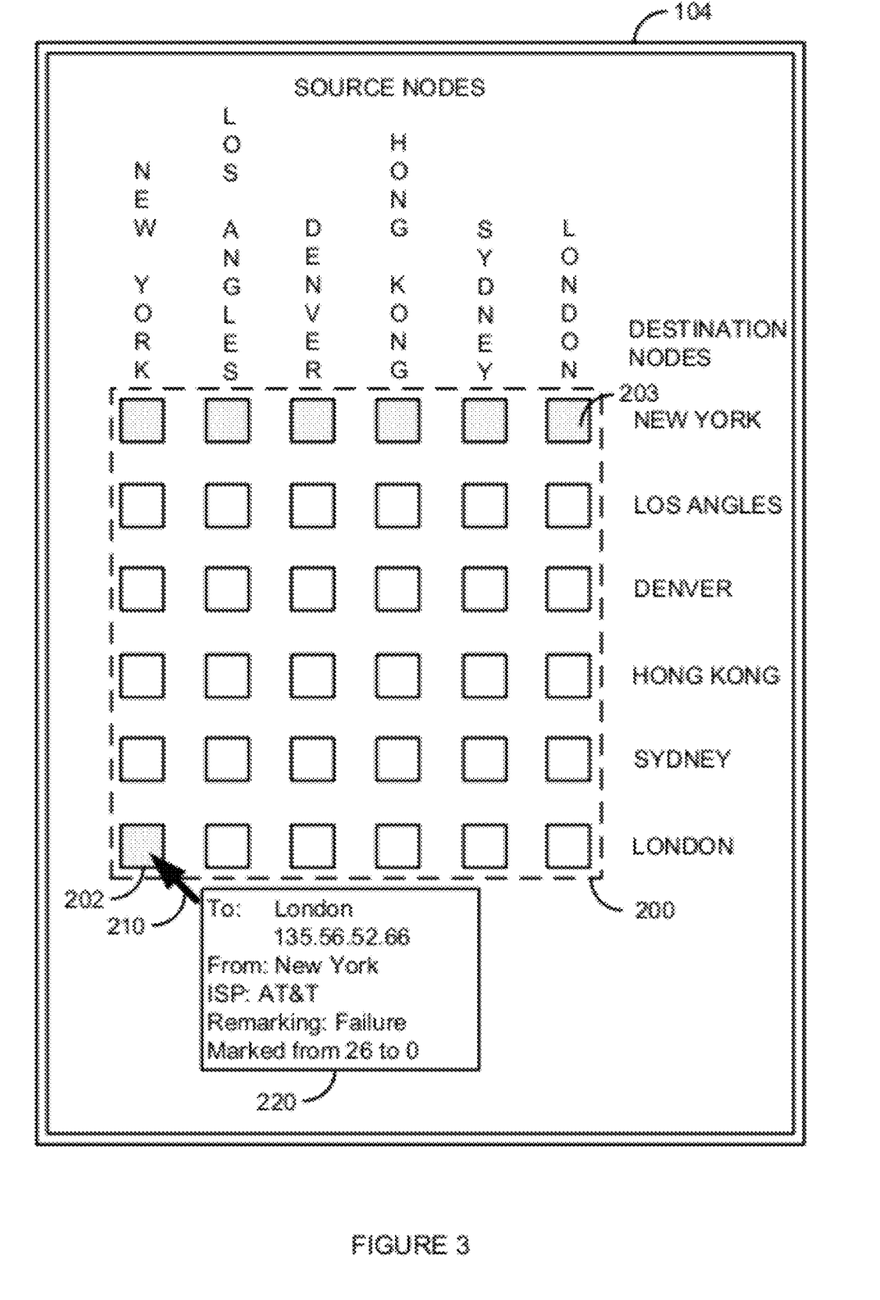
FIG. 3 is a diagram of a display for displaying changes in packets in a network.

FIG. 3 is a diagram of a display 104 for displaying changes in packets in a network 110. FIG. 3 shows a matrix 200 that displays a plurality of source nodes 101 (or network interfaces 103) and a plurality of destination nodes 120. In FIG. 3, the source nodes 101 are illustratively represented on the top of the display 104 and the destination nodes 120 are illustratively represented on the right hand side of the display 104. However, the destination nodes 120 and the source nodes 101 can be switched in the display 104. An element in the matrix 200 between two cities represents a communication path between the source node 101 in one city and the destination node 120 in the other city. For example, element 202 represents a communication path between source node 101 in New York and destination node 120 in London. In the opposite corner of the matrix 200, element 203 represents a communication path between a source node in London and a destination node in New York. In this example, each source node 101 in the matrix 200 is also a destination node 120.

A failure (e.g., an improper marking, change of a port number, etc.) in a particular network node 111 (typically in close proximity to a destination node 120 or a source node 101) will be represented by an indication (darker) in all elements corresponding to the failed network node 111. For example, if a gateway network node 111 that routes all packets to the New York destination node is improperly marking packets and all other sources nodes 101 (Los Angles-London) send packets through the gateway network node 111, then all the elements in the row of the New York destination node 120 will indicate a failure as shown by the darkened element in the row of the New York destination node 120. Likewise, if a gateway network node 111 near a source node 101 has a failure, then the corresponding elements in the column for the source node 101 would be darkened to indicate the failure. The indication for a failure can be done using various colors. For example, different colors could indicate different types of errors such as a marking error, a marking error for a specific packet type (e.g., voice), a node failure, and the like.

An element can be selected to display detailed statistics about which network node(s) 111 changed the additional field in a particular communication path. For example, a user could place a cursor over 210 and/or click on element 202 using the cursor 210 and a mouse (not shown). This results in the display of dialog box 220. In this example, the network node 111 with the IP address of 135.56.52.66 is the network node 111 that improperly marked the DCSP marking in the test packet from 26 to 0. This way, a user can quickly identify the specific network node 111 in the network 110 that is causing the problem and what the specific problem is.

Figure 4:
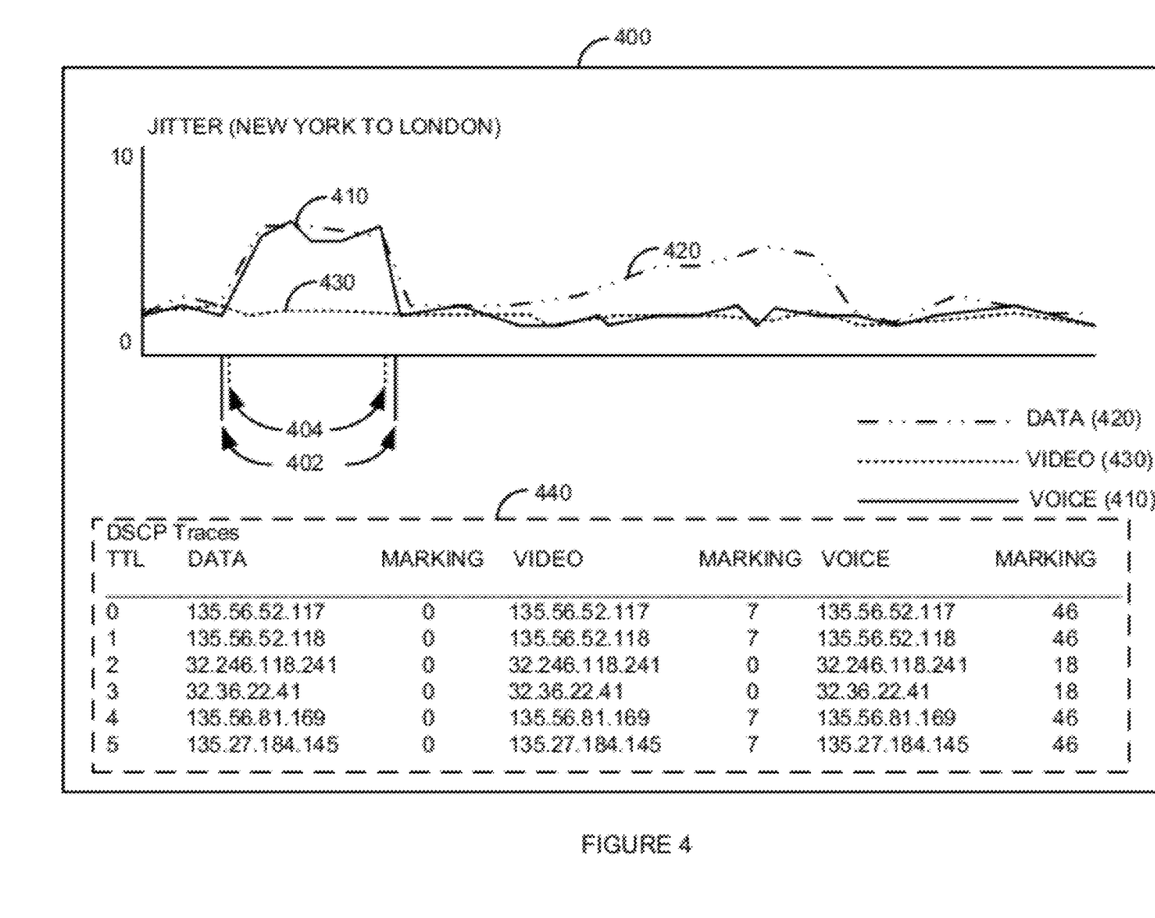
FIG. 4 is a diagram of a display for displaying changes in packets for multiple data types.

FIG. 4 is a diagram of a display 400 for displaying changes in packets for multiple data types. FIG. 4 can be displayed by a user selecting an element 202 in the matrix by doing, for example, a click with a cursor 210 or a mouse-over. The display 400 is an exemplary diagram that shows jitter between the source node 101 in New York and the destination node 120 in London. Jitter (delay) is shown for three test packet types over time: voice 410, data 420, and video 430. Voice change markers 402 indicate changes in the additional field (markings) in voice packets. Video change markers 404 indicate changes in the additional field (markings) in video packets. Here the markers 402 and 404 are differentiated using solid versus dashed lines. However, different colors can also be used.

The comparison between the different packet types reveals the association there is between the marking and the end-to-end performance. The expectation in a well-configured solution will be that voice 410 packets are subject to minimal jitter, data 420 packets are subject to an amount of jitter that depends on the volume of all packets, and video 430 packets are somewhere in between. The expectation is that voice jitter should show no relationship to the volume of all traffic. A strong relationship between voice jitter, data jitter, and all traffic is an indication of a misconfiguration. Likewise, a strong relationship between video jitter and data jitter is an indication of a misconfiguration.

The above associations can be measured by a numerical correlation and that correlation can be used to determine whether voice 410 packets or video 430 packets are afforded adequate protection from all types of packets. The system can generate alarms when audio jitter or video jitter is not afforded such protections.

The communication path section 440 displays each of the network nodes 111 that have received the test packet and has an indication of how the additional field has been changed. For example, the communication path for data test packets indicates that none of the network nodes 111 changed the additional field (marking) For video test packets, as the test packets traverse from the local network (indicated by 135.56.52.XXX IP addresses) to the service provider network (indicated by 32.XXX.XXX.XXX IP addresses) and then back, the markings changed from 7 to 0 and from 0 to 7. Likewise, for voice test packets the markings were changed from 46 to 18 and then back to 46 as the packets traversed the service provider network.

From the display 400, a user can determine if a specific type of packet is being marked properly. For example, upon detecting the first change in the additional field for voice (at the first voice change marker 402), there is a significant increase in jitter until the marking is changed back again (at the second voice change marker 402). This corresponds with the voice test packets that were marked from 46 to 18 and then back to 46 in the communication path section 440. When the voice test packets were marked to 18, the jitter dramatically increased. This can be compared to a Service Level Agreement. If the markings (e.g., marking to 18 when the marking should have been to 22) are not set properly, the system can identify this problem as being outside the Service Level Agreement. From the display 400, the user can quickly identify that network nodes 111 with the IP addresses of 32.246.118.241 and 32.36.22.41 are improperly marking voice packets with a marking of 18 instead of 22.

On the other hand, the system also identifies that video test packets are being properly marked. In this example, the jitter for the video test packets remains consistent when the video test packets are changed from 7 to zero and then back to 7 when leaving the service provider network. This is compared to the Service Level Agreement and determined to be within the requirements of the Service Level Agreement.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   determining one or more changes in one or more test packets sent between a plurality of source nodes and destination nodes, wherein each source node is a destination node, wherein each test packet comprises an additional field subject to modification as the one or more test packets traverses one or more network nodes;
   determining if the additional field in the one or more test packets has have been changed by one or more network nodes; and
   generating a display matrix that identifies the one or more changes by the one or more network nodes, wherein the display matrix includes column and rows forming two axes, wherein the source nodes are provided along a first axis of the display matrix and the destination nodes are provided along a second axis, wherein a plurality of elements form the matrix, wherein each element is located at an intersection between a source node on the first axis and a destination node on the second axis and represents a communication path between the source node and the destination node, and wherein a failure in a network node is represented in an element.

2. The method of claim 1, further comprising sending a plurality of test packets with a plurality of values in the additional field between the source and destination nodes.

3. The method of claim 2, wherein selecting one of the individual elements further comprising the step of displaying in a display each of the one or more network nodes that changed the additional field with the plurality of values.

4. The method of claim 2, wherein the one or more changes are displayed in different colors in the matrix based on the one or more changes by the one or more network nodes and the plurality of values in the additional field.

5. The method of claim 2, wherein selecting one of the elements displays individual statistics for the one or more test packets sent between the one source node and the one destination node represented by the element.

6. The method of claim 5, wherein the individual statistics are displayed in relation to each other over time and in relation to when the additional field changed.

7. The method of claim 5, wherein the individual statistics display each network node in the communication path and the value of the additional field at each network node in the communication path.

8. The method of claim 1, wherein determining further comprises determining if the additional field in the one or more test packets have been changed in relation to a Service Level Agreement (SLA).

9. A system comprising:
   a packet processor configured to:
      send a first test packet from a first source node to a first destination node, wherein the first test packet comprises an additional field subject to modification as the first test packet traverses one or more network nodes between the first source node and the first destination node, and wherein the first test packet includes a hop count field;
      wait for a response from a network node;
      receive a response packet from a network node;
      determine whether the network node changed the additional field included in the response packet;
      if there is a change, identify the network node that changed the additional field;
      if there is no change, increment the hop count and send at least a second test packet from the source node to the destination node;
      determine if there are one or more other changes to the additional field as received from one or more other response packets;
      repeat the sending of test packets and determining changes to the additional field for each pair of source and destination nodes; and
   a display generator configured to generate a display matrix that identifies the one or more changes by the one or more network nodes.

10. The system of claim 9, further comprising a network interface configured to send a plurality of test packets with a plurality of values in the additional field between the source nodes and destination nodes.

11. The system of claim 10, wherein the matrix comprises individual elements that represent a communication path between one source node and one destination node, and wherein selecting one of the individual elements and a display configured to display each of the one or more network nodes that changed the additional field with the plurality of values.

12. The system of claim 10, wherein the one or more changes are displayed in different colors based on the one or more changes by the one or more network nodes and the plurality of values in the additional field.

13. The system of claim 10, wherein the matrix comprises individual elements that represent a communication path between one source node and one destination node and selecting one of the individual elements displays individual statistics for the one or more test packets sent between the one source node and the one destination node represented by the element.

14. The system of claim 13, wherein the individual statistics are displayed in relation to each other over time and in relation to when the additional field changed.

15. The system of claim 13, wherein the individual statistics display each network node in the communication path and the value of the additional field at each network node in the communication path.

16. The system of claim 9, wherein the packet processor is further configured to determine if the additional field in the one or more test packets have been changed in relation to a Service Level Agreement (SLA).

* * * * *

UNITED STATES PATENT AND TRADEMARK OFFICE
CERTIFICATE OF CORRECTION

PATENT NO.        : 8,238,254 B2
APPLICATION NO.   : 12/622840
DATED             : August 7, 2012
INVENTOR(S)       : Jean Meloche It is certified that error appears in the above-identified patent and that said Letters Patent is hereby corrected as shown below:

Claim 1, Column 9, line 36, delete "have".

Claim 9, Column 10, line 32, replace "that identifies the one" with --that identifies one--.

Signed and Sealed this
Twenty-third Day of October, 2012

David J. Kappos
*Director of the United States Patent and Trademark Office*